June 16, 1959

R. G. PIETY 2,891,166

WELL LOGGING

Filed March 15, 1954

INVENTOR.
R.G. PIETY

BY *Hudson & Young*

ATTORNEYS

INVENTOR.
R. G. PIETY
BY Hudson & Young
ATTORNEYS

June 16, 1959

R. G. PIETY 2,891,166

WELL LOGGING

Filed March 15, 1954

INVENTOR.
R. G. PIETY
BY Hudson & Young
ATTORNEYS

United States Patent Office 2,891,166
Patented June 16, 1959

2,891,166

WELL LOGGING

Raymond G. Piety, Bartlesville, Okla., assignor to Phillips Petroleum Company, a corporation of Delaware Application March 15, 1954, Serial No. 416,048

10 Claims. (Cl. 250—83.3)

This invention relates to the logging of wells wherein radiation from adjoining strata is detected. In another aspect it relates to radiation detecting and recording apparatus.

Valuable information can often be obtained concerning the strata intersected by a well bore by means of a gamma ray log. Such a log is made by passing one or more radiation detectors through the well bore to measure radiation emitted from the adjoining formations. The detected radiation can be either natural or artificially induced.

A number of instruments are known in the art which can be employed to detect such radiation. Probably the most common of these instruments is the Geiger counter which comprises a cylindrical cathode having an elongated anode therein. The two elements are contained within an envelope which is filled with a gas at a relatively low pressure, and an electrical potential is applied across the anode and cathode through an impedance element. This potential is maintained at such a level that the counter will conduct electricity when the gas within the envelope is ionized by radiation entering the chamber. These counters usually are adapted to provide a single output pulse representative of each radiation unit impinging thereon.

A second form of measuring instrument is the proportional counter which comprises an ionization chamber containing two spaced electrodes having a relatively high electrical potential thereacross. The space between the electrodes being filled with an ionizable gas at a pressure considerably higher than in a Geiger counter so that a continuous current flows between the electrodes at all times. The magnitude of this current is a function of the degree of ionization of gas between the electrodes, and this in turn, is a function of the radiation impinging upon the counter. This type of counter thus provides an indication of the magnitude of the radiation being detected.

A third type of presently known counter makes use of the phenomenon that radioactive substances cause momentary light emission or scintillations when their emitted radiation impinges substances such as zinc sulfide. These scintillations can be measured by an electron photomultiplier tube.

In well logging it is important that the resolving power of the measuring instrument be sufficient to detect thin beds. In order to detect such thin beds it is necessary that the counter be relatively small so as not to overlap several beds. However, such a small counter is likely to introduce errors because of the statistical fluctuations in the detected radiation. It is common practice to record gamma ray measurements by recording galvanometers wherein the deflection of the galvanometer is proportional to the detected radiation. The individual radiation signals are averaged by some type of integrating device over a period long enough to reduce the statistical fluctuations to a small value. However, this averaging process results in a time lag which distorts the record and makes it more difficult to identify the formation changes. Changes in apparent depth of the indicated signal are due to the fact that the detector actually moves through the well while the averaging process takes place.

In accordance with the present invention there is provided an improved method of measuring and recording radioactive signals wherein integration of the detected signals is accomplished without changing the apparent depth at which the signals are received. The electrical signals established by the radiation detector are employed to energize a source of light. Electrical circuitry is provided such that the source of light is energized for each particle or unit of radiation received, or for a multiple of such particles or units if desired. The light is focused by suitable optical means to provide a thin line of radiation incident upon a photographic film. The film is moved transversely of the line of radiation at a rate representative of the rate at which the detector is moved through the well bore. In this manner the density of the exposed photographic plate is a function of the radiation received by the detector. In regions of maximum radiation, a large number of lines are exposed on the photographic plate per unit length. This arrangement has the advantage of providing a visible record which can be correlated directly with the conventional lithographic logs which are made by geologists to represent the strata intersected by well bores. The variable density photographic film is much more readily compared with such lithographic logs than is the conventional electrical log wherein the signal is represented by a wavy galvanometer trace.

A system is also provided in accordance with this invention to increase the useful range of such a variable density recording system. The optical system can be modified such that the radiation impinging upon the photographic plate is in the form of a rectangle. A tapered aperture is positioned in the path of this radiation so that varying portions of the rectangular radiation beam expose the photographic film. In this manner the total radiation impinges the photographic plate at one end of the aperture while preselected portions of the radiation impinge the photographic film at the second end of the aperture. Essentially, this provides two or more separate records of the detected radiation.

Accordingly, it is an object of this invention to provide an improved method of detecting and recording radiation.

Another object is to provide an improved electro-optical recording system.

A further object is to provide a method of and apparatus for increasing the range of a photographic recorder.

Various other objects, advantages and features of this invention should become apparent from the following detailed description taken in conjunction with the accompanying drawing in which.

Figures 1, 3:
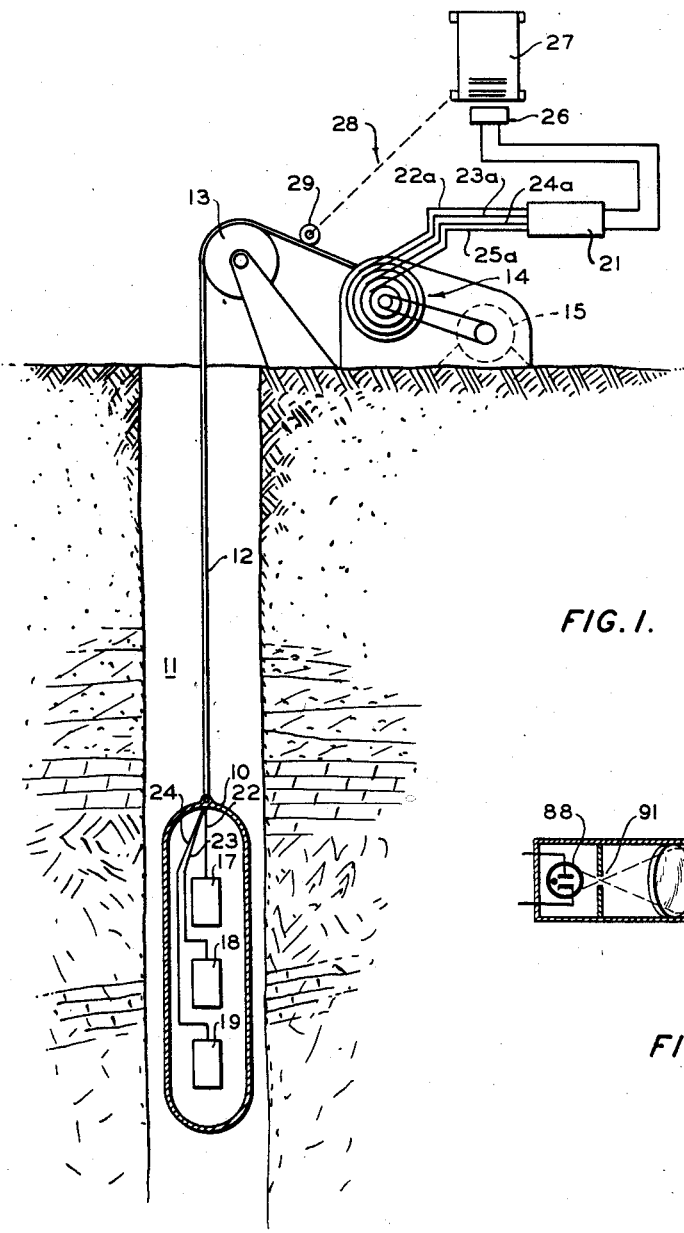
Figure 1 is a schematic representation of the radiation detecting and recording apparatus of this invention.
Figure 3 is a schematic view of one embodiment of the optical recording system of this invention.

Referring now to the drawing in detail and to Figure 1 in particular, there is shown well logging apparatus which comprises a hollow casing 10 that is adapted to be lowered into a well bore 11 by a cable 12. The lower end of cable 12 is attached to casing 10 and upper end of cable 12 extends over a pulley 13 to a reel 14 which is operated by a motor 15. One or more radiation detectors 17, 18 and 19 is positioned within casing 10 and electrically connected to indicating apparatus 21 positioned at the surface by electrical leads such as 22, 23 and 24 which extend to the surface through cable 12. The upper ends of leads 22, 23 and 24 engage slip rings mounted on reel 14. These slip rings in turn are engaged by respective brushes which are connected to respective leads 22a, 23a and 24a, the latter terminating at the indicating circuit 21. A power lead 25a is connected in like manner between circuit 21 and cable 12. An optical recorder 26 exposes a photographic film 27 which is rotated by suitable mechanical linkage 28 extending between film 27 and a wheel 29. Wheel 29 is rotated by cable 12 such that film 27 is moved at a rate proportional to the rate of movement of casing 10 through well bore 11. The signal received at unit 21 exposes film 27 in the manner described hereinafter in detail. In one embodiment of the recording system, the signals from detectors 17, 18 and 19 are recorded by recorder 26. In another embodiment, each detector energizes a separate recorder 26, not shown.

Figure 2:
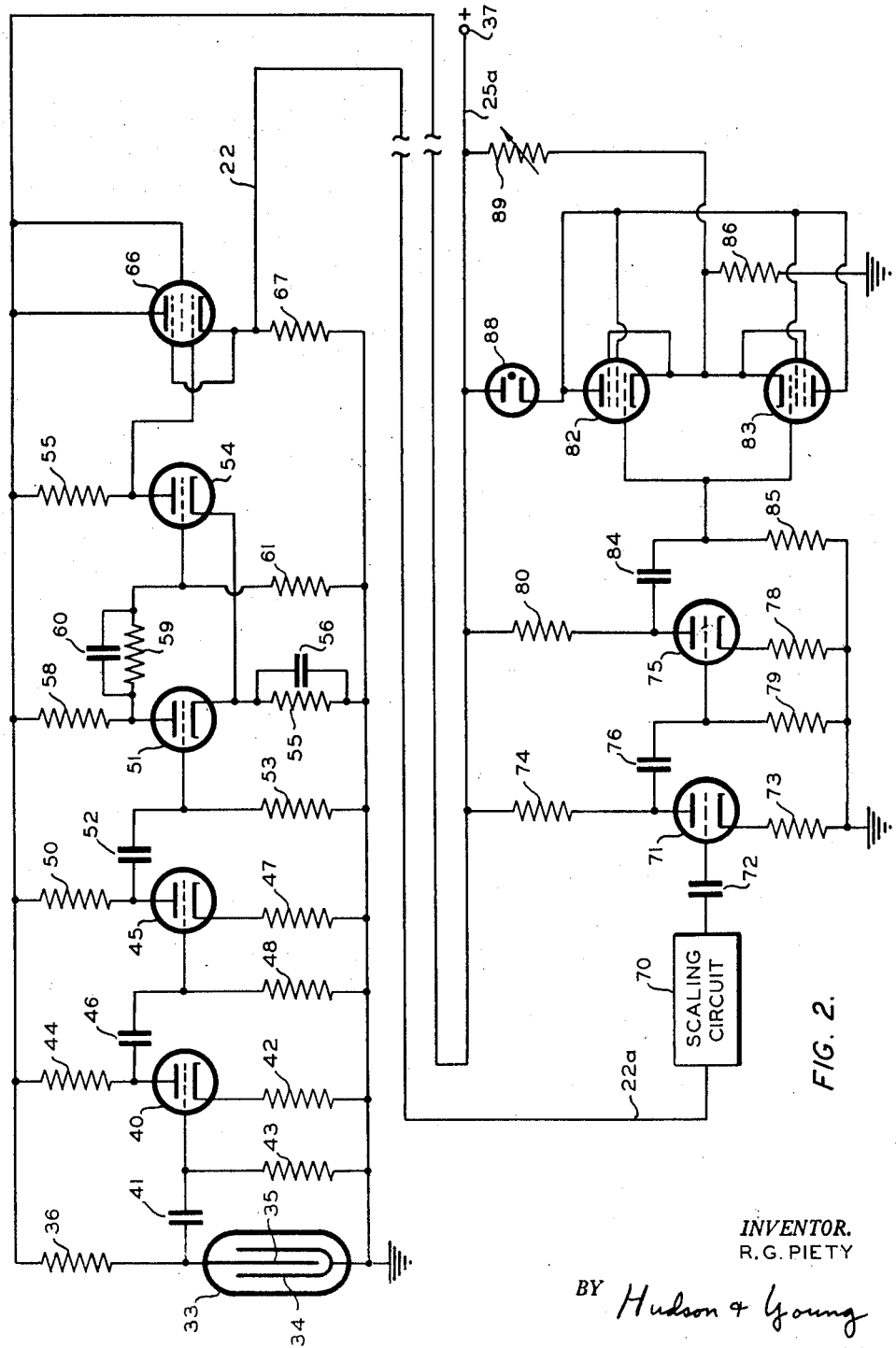
Figure 2 is a schematic diagram of one embodiment of the electrical circuitry employed to carry out this invention.

A first embodiment of the electrical indicating system of this invention is illustrated in Figure 2. Detector 17, for example, comprises a Geiger tube 33 having a cathode 34 and an anode 35. Cathode 34 is connected to a point of reference potential, which can be the electrically grounded casing 10, and anode 35 is connected through a resistor 36 to a terminal 37 that is maintained at a positive potential. Anode 35 is also connected to the control grid of a triode 40 through a capacitor 41. The cathode of triode 40 is connected to ground through a resistor 42, and the control grid of triode 40 is connected to ground through a resistor 43. The anode of triode 40 is connected to terminal 37 through a resistor 44 and to the control grid of a second triode 45 through a capacitor 46. The cathode of triode 45 is connected to ground through a resistor 47, and the control grid of triode 45 is connected to ground through a resistor 48. The anode of triode 45 is connected to terminal 37 through a resistor 50 and to the control grid of a third triode 51 through a capacitor 52. The control grid of triode 51 is connected to ground through a resistor 53. The cathode of triode 51 is connected to the cathode of a fourth triode 54, and these two cathodes are connected to ground through a resistor 55 which is shunted by a capacitor 56. The anode of triode 51 is connected to terminal 37 through a resistor 58 and to the control grid of triode 54 through a resistor 59 which is shunted by a capacitor 60. The control grid of triode 54 is connected to ground through a resistor 61. The anode of triode 54 is connected to terminal 37 through a resistor 55 and directly to the control grid of a pentode 66. The screen grid of pentode 66 is connected to terminal 37, and the suppressor grid of pentode 66 is connected to the cathode thereof. The anode of pentode 66 is connected to terminal 37. The cathode of pentode 66 is connected to ground through a resistor 67 and is also connected to lead 22 which extends to the surface through cable 12. The apparatus thus far described constitutes one of the detectors positioned within casing 10.

The surface equipment contained in unit 21 is connected to detector 17 by lead 22a which is connected to an input terminal of a suitable scaling circuit 70, which can be employed if desired to provide an output signal of a frequency which is a predetermined fraction of the frequency of the signal applied to the input terminal thereof. Such scaling circuits are well known in the art for use with Geiger counters when the detected radiation is of too high a frequency to actuate conventional detecting apparatus. The output terminal of scaling circuit 70 is connected to the control grid of a triode 71 through a capacitor 72. The cathode of triode 71 is connected to ground through a resistor 73. The anode of triode 71 is connected to terminal 37 through a resistor 74 and to the control grid of a triode 75 through a capacitor 76. The cathode of triode 75 is connected to ground through a resistor 78, and the control grid of triode 75 is connected to ground through a resistor 79. The anode of triode 75 is connected to terminal 37 through a resistor 80 and to the control grids of a pair of pentodes 82 and 83 through a capacitor 84. The control grids of pentodes 82 and 83 are connected to ground through a common resistor 85. The cathodes of pentodes 82 and 83 are connected to one another and to ground through a common resistor 86. The anodes of pentodes 82 and 83 are connected to one another and to the cathode of a neon tube 88. The anode of tube 88 is connected to terminal 37. The cathodes of triodes 82 and 83 are also connected to terminal 37 through a variable resistor 89. The screen grids of pentodes 82 and 83 are connected to the anodes of these tubes, and the suppressor grids of tubes 82 and 83 are connected to the cathodes of these tubes.

Whenever penetrating radiation enters tube 33, the gas therein is ionized and the resulting electrons complete a circuit path between anode 35 and cathode 34. This momentary electron surge causes current to flow through resistor 36 so that the potential on the anode of Geiger tube 33 is suddenly decreased. This results in a voltage pulse being applied through capacitor 41 to the control grid of triode 40, which voltage pulse is amplified by triodes 40 and 45 and applied to the control grid of triode 51. Triode 51 is connected with triode 54 to form a one-shot multivibrator. The output pulse from triode 54 is applied to the control grid of power amplifier 66, and the output pulse therefrom is transmitted to the surface through lead 22. If the measured pulses are of too high a frequency to be detected by the indicating apparatus, circuit 70 is employed to scale down the frequency of these pulses. The output pulses from circuit 70 are amplified by triodes 71 and 75 and applied to the control grids of pentodes 82 and 83. The current flow through these two pentodes passes through tube 88. A second parallel path is provided by resistor 89 which is adjusted such that an extremely small current flows through tube 88 in the absence of an input pulse. Whenever a pulse is received, the current flow through tube 88 is suddenly increased to provide a flash of light therefrom.

The light emitted from tube 88 is focused on film 27 of recorder 26 by the optical system shown in Figure 3. An aperture 91 is positioned adjacent tube 88 to form a point source of light. A spherical converging lens 92 is positioned adjacent aperture 91 such that aperture 91 lies in the focal plane of lens 92. Thus, parallel beams of radiation are formed by lens 92. These beams subsequently are converged by a cylindrical lens 93 and focused as thin lines 94 on film 27. Film 27 is moved transversely of lines 94 at a rate which is a function of the rate at which casing 10 is moved through well bore 11. Whenever detector 17 is moved through a region of weak radiation the lines 94 appearing on film 27 are relatively widely spaced, and when detector 17 is moved through a region of intense radiation the lines 94 are more closely spaced. Thus, the density of the exposed portion of film 27 is a function of the radiation detected by unit 17. This variable density record in effect provides an integration of the measured pulses that is not affected by the time lag inherent in most electrical integration devices. Furthermore, the recorded variable density image can readily be compared with conventional lithographic records so that correlations between the measured radiation and other known properties can readily be made.

Figure 4:
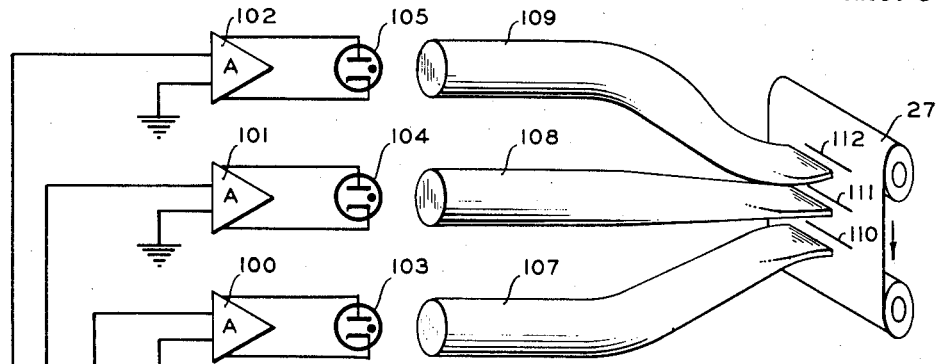
Figure 4 illustrates an optical recording system to increase the magnitude of the detected signal from a plurality of radiation detectors.

In Figure 4 there is shown an arrangement which can be employed to increase the magnitude of the recorded signal in regions of weak radiation. This arrangement incorporates a plurality of detectors 17, 18 and 19. The output signals from these detectors are amplified by individual amplifiers 100, 101 and 102 which energizes respective light sources 103, 104 and 105. The radiation emitted from light sources 103, 104 and 105 is focused on film 27 by respective light guides 107, 108 and 109 so that respective lines 110, 111 and 112 are focused on film 27 in adjacent parallel relation. Light guides 107, 108 and 109 can be formed of glass or other suitable transparent materials such as lucite, for example. The radiation entering these guides is transmitted by internal reflection to impinge upon film 27. The use of these light guides is preferred when it is desired to record several lines in closely spaced relation with one another because the focused beam of light can readily be directed to any desired location. Alternatively, the lens system of Figure 3 can be employed in place of these light guides if desired.

In the system of Figure 4, film 27 is moved at a speed which is a function of the speed at which casing 10 is moved through well bore 11. Thus, the radiation detected by unit 19 at a given depth in the well is recorded on film 27 as line 112. At a later time, detector 18 is moved into the region previously occupied by detector 19. At this later time, film 27 is advanced such that the region indicated by line 112 is moved into the region previously occupied by line 111. Thus, the signal originally transmitted to film 27 at the region of line 112 is increased by the second signal received by unit 18 and recorded on film at the same location. In like manner, the signal subsequently received by unit 17 at this given location is again recorded on film 27 at the same point. This results in a magnification of a signal received from a given region without the use of a larger detector which would reduce the resolving power of the recording system.

Figure 5:
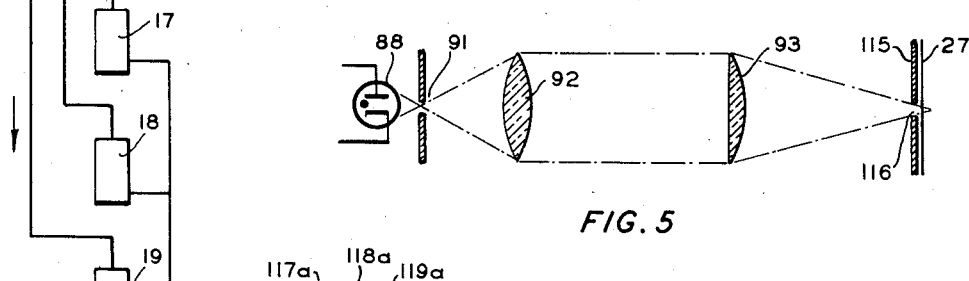
Figure 5 is a schematic representation of an optical recording system employing a shaped aperture to extend the useful range of a recorder.
Figures 6A, 6B, 6C:
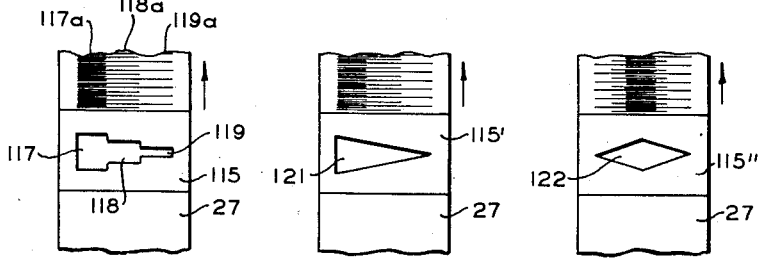
Figures 6a, 6b and 6c illustrate several configurations of the aperture employed in the system of Figure 5.

In Figure 5 there is shown a modified form of the optical system of Figure 3 which is effective to increase the useful range of the recording system. In this arrangement, film 27 is moved somewhat closer to cylindrical lens 93 such that the image formed by lens 93 is focused at a point behind film 27. This results in a rectangular bar of radiation impinging upon film 27. An opaque plate 115 having an opening 116 therein is positioned immediately forward of film 27. Three possible configurations of plate 115 are illustrated in Figures 6a, 6b, and 6c. In Figure 6a, opening 116 is provided with three separate sections 117, 118 and 119 of progressively narrower widths. This effectively divides the exposed portion of film 27 into three sections 117a, 118a and 119a which receive varying amounts of light from lens 93. The bar of radiation tending to impinge upon plate 27 is as wide as the opening of portion 117. Thus, the total radiation from any given light flash exposes section 117a of film 27. In the region of opening 118, a lesser portion of the total radiation is transmitted through plate 115 to expose film 27. This results in an exposure which is representative of only a portion of the radiation received. The radiation exposing the section 119a of film 27 is still further reduced in magnitude. Thus, when the detectors are employed in regions of intense radiation, section 117a of film 27 may be exposed completely so that the magnitude of the detected radiation cannot be determined. Section 119a, however, does not receive the total light representative of the detected radiation and is not exposed as completely as section 117a. The exposure of section 118a is intermediate that of section 117a and 119a. It can thus be seen that three separate tracks are formed on film 27 which represent varying fractions of the received radiation. In regions where the measured radiation is very weak, section 117a of film 27 is the most useful.

The apertured plate 115' shown in Figure 6b is provided with a triangular opening 121 which provides a continuously diminishing exposure of film 27 in a direction transversely of the film. The apertured plate 115" of Figure 6c is provided with a rhombus shaped opening 122 so that the center portion of the film is fully exposed whereas the two outer edges are exposed to a lesser degree. It should thus be apparent that the apertured plates provide varying degrees of exposure on film 27 so that signals of varying magnitude can be identified on a single photographic film.

Figures 7, 8:
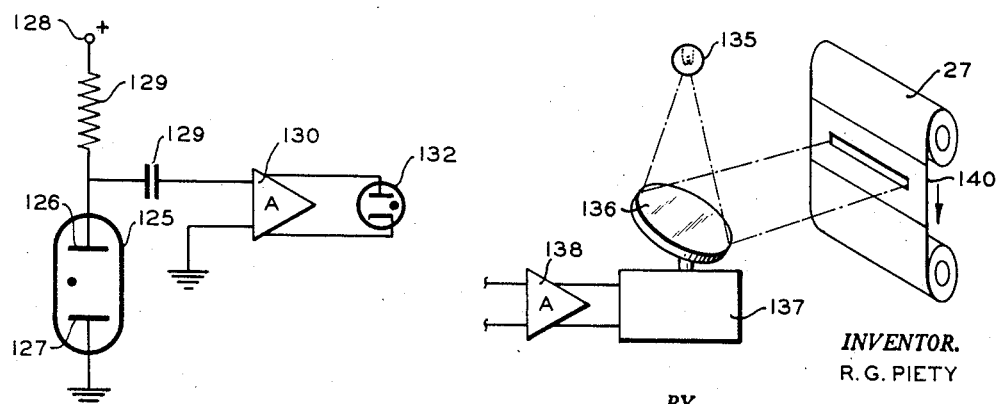
Figure 7 is a schematic diagram of a second embodiment of the electrical detecting circuitry.
Figure 8 is a modified form of an optical recorder employing a reflecting galvanometer.

In Figure 7 there is shown a schematic representation of a proportional counter which is useful to measure the magnitude of the individual particles or units of radiation. This counter comprises a gas-filled envelope 125 having a pair of spaced electrodes 126 and 127 therein. Electrode 127 is connected to ground and electrode 126 is connected to a source of positive potential 128 through a resistor 129. The potential at 128 is adjusted such that a small amount of current flows through tube 125 at all times. The magnitude of this current is a function of the ionization of the gas within chamber 125, which in turn is a function of the magnitude of the measured radiation. Electrode 126 is connected through a capacitor 129 to one input terminal of a conventional amplifier 130, the second input terminal of which is grounded. The output of amplifier 130 is applied to a tube 132. This arrangement can be employed with any of the recording systems described herein.

In Figure 8 there is shown still another embodiment of an optical recording system. In this arrangement, light from a source 135 is directed to a mirror 136 which is connected to the moving element of a galvanometer 137. The position of mirror 136 is a function of the output signal of an amplifier 138, the input of which is energized by a radiation detector such as 17 or 125. The mirror 136 of galvanometer 137 normally is biased such that in the absence of an input signal to galvanometer 137 the light beam is directed to the side of film 27. Whenever a pulse is applied to galvanometer 137, mirror 136 is rotated such that the light beam sweeps across film 27 and exposes a region thereof behind a slotted aperture 140. In this manner a line is exposed on film 27 representative of each individual pulse received by galvanometer 137.

From the foregoing description it should be apparent that there is provided in accordance with this invention an improved system for detecting and recording penetrating radiation received by radiation detectors moved through a well bore. This system is useful in detecting and recording any type of radiation emitted from formations adjacent a well bore. In addition, the recording system per se is useful in recording any electrical signal. While the invention has been described in conjunction with present preferred embodiments thereof, it should be understood that the invention is not limited thereto.

What is claimed is:

1. Well logging apparatus comprising, in combination, a plurality of radiation detecting elements, means to move said elements through a well in equally spaced vertical relationship, a photographic film, a plurality of equally spaced radiation emitters positioned adjacent said film, means to energize said emitters in response to the output signals from respective ones of said detecting elements, a plurality of spherical lenses, each of said spherical lenses being positioned adjacent a respective one of said emitters so that said emitter is in the focal plane of said spherical lens, a plurality of cylindrical lenses, each of said cylindrical lenses being in optical alignment with a respective one of said emitters and said spherical lenses, said cylindrical lenses being positioned with respect to said film so that parallel beams of radiation formed by said spherical lenses are focused as lines on said film by said cylindrical lenses, and means to move said film relative to said emitters at a speed proportional to the speed of movement of said detecting elements through the well so that radiation emitted from a given level in the well is recorded at a common portion on said film by each of said detecting elements and its associated emitter.

2. Well logging apparatus comprising, in combination, a plurality of radiation detecting elements, means to move said elements through a well in equally spaced vertical relationship, a photographic film, a plurality of radiation emitters positioned adjacent said film, means to energize said emitters in response to the output signals from respective ones of said detecting elements, a plurality of elongated members formed of radiation transmitting material, corresponding first ends of each of said members being positioned adjacent respective ones of said emitters, corresponding second ends of said members being positioned adjacent said film in equally spaced relationship with one another longitudinally of said film so that radiation from said emitters is directed through respective ones of said members by internal reflection to expose said film, and means to move said film relative to and longitudinally of the second ends of said members at a speed proportional to the speed of movement of said detecting elements through the well so that radiation emitted from a given level in the well is recorded at a common portion on said film by each of said detecting elements and its associated emitter.

3. Gamma ray well logging apparatus comprising, in combination, an elongated casing, a plurality of gamma ray detecting elements positioned within said casing in equally spaced relationship with one another along the longitudinal axis of said casing, means to move said casing through a well so that said detecting elements are maintained in spaced vertical relationship, a photographic film, a plurality of equally spaced radiation emitters positioned adjacent said film, a plurality of amplifying means connected between respective ones of said detecting elements and said radiation emitters so that said emitters are energized in response to the output signals from respective ones of said detecting elements, and means to move said film relative to and longitudinally of said emitters at a speed proportional to the speed of movement of said casing through the well so that radiation emitted from a given formation in the well is recorded at a common portion on said film by each of said detecting elements and its associated radiation emitter.

4. Well logging apparatus comprising, in combination, a plurality of radiation detecting elements, each of said elements providing electrical pulses representative of the radiation impinging thereon, means to move said elements through a well in equally spaced relationship, a photographic film, a plurality of equally spaced radiation emitters positioned adjacent said film, said emitters being energized by electrical signals being applied thereto, a plurality of amplifying means having their input terminals connected to respective ones of said detecting elements and their output terminals connected to respective ones of said radiation emitters, each of said amplifiers including a pair of vacuum tubes having their cathodes connected to one another, their control grids connected to one another and their anodes connected to one another, means for applying input signals to the control grids of said vacuum tubes representative of the outputs of respective ones of said detectors, and means to apply the output signal from said vacuum tubes to said radiation emitters, and means to move said film relative to said emitters at a speed proportional to the speed of movement of said detecting elements through the well so that radiation emitted from a given level in the well is recorded at a common portion on said film by each of said detecting elements and its associated radiation emitter.

5. The combination in accordance with claim 4 further comprising a plurality of pulse scaling circuits, each of said circuits being connected between one of said radiation detectors and its associated radiation emitter so that a predetermined fraction of the pulses received by said detector energizes said emitter.

6. Well logging apparatus comprising, in combination, a plurality of radiation detecting elements, each of said elements providing electrical pulses representative of the radiation impinging thereon, means to move said elements through a well in equally spaced relationship, a photographic film, a plurality of equally spaced radiation emitters positioned adjacent said film, said emitters being energized by electrical signals being applied thereto, a plurality of pulse forming circuits having their input terminals connected to the outputs of respective ones of said detectors, a plurality of amplifiers having their input terminals connected to the output terminals of respective ones of said pulse forming circuits, each of said amplifiers including a pair of vacuum tubes having their cathodes connected to one another, their control grids connected to one another and their anodes connected to one another, said emitters being connected in series with the two parallel connected tubes of respective ones of said amplifiers, a resistor connected in parallel with each of said tubes and its associated emitter, means for applying input signals to the control grids of said vacuum tubes representative of the outputs of respective ones of said detectors, and means to apply the output signal from said vacuum tubes to said radiation emitters, and means to move said film relative to said emitters at a speed proportional to the speed of movement of said detecting elements through the well so that radiation emitted from a given level in the well is recorded at a common portion on said film by each of said detecting elements and its associated radiation emitter.

7. Well logging apparatus comprising, in combination, a plurality of radiation detecting elements, means to move said elements through a well in equally spaced vertical relationship, a photographic film, a plurality of radiation emitters positioned adjacent said film, a plurality of galvanometers, each of said galvanometers having a mirror associated therewith which is rotated in response to the input signal applied to said galvanometer, the mirrors of said galvanometer being positioned with respect to said radiation emitters so that radiation beams from said emitters are reflected by said mirrors on said photographic film in equally spaced relationship with one another longitudinally of said film, means to energize said galvanometer in response to the output signals from respective ones of said detecting elements, said galvanometers normally being biased so that radiation reflected by the mirrors does not impinge upon said film, the rotation of said mirrors in response to the output signals from said detecting elements directing radiation on said photographic film, and means to move said film relative to and longitudinally of said mirrors at a speed proportional to the speed of movement of said detecting elements through the well so that radiation emitted from a given level in a well is recorded at a common portion on said film by each of said detecting elements and its associated galvanometer.

8. Apparatus for recording a pulsing electrical signal, comprising, in combination, a source of light, means to energize said source of light in response to said signal, a photographic film, a spherical lens positioned with respect to said source whereby said source is in the focal plane of said spherical lens, a cylindrical lens in optical alignment with said source and said spherical lens whereby the parallel beams of light formed by said spherical lens are focused as a line on said film by said cylindrical lens, and means to move said film perpendicular to said line so that a continuous record of said signal is provided on said film, the density of exposure of said film being a function of the frequency of said signal.

9. Well logging apparatus comprising first and second radiation detecting elements, means to move said elements through a well in spaced vertical relationship, a photographic film, first and second radiation emitters positioned adjacent said film in spaced relationship longitudinally of said film, means to energize said emitters in response to the output signals from respective ones of said detecting elements, and means to move said film relative to and longitudinally of said emitters at a speed proportional to the speed of movement of said detecting elements through the well so that radiation emitted from a given level in the well is recorded at a common portion of said film by each of said detecting elements and its associated radiation emitter.

10. Well logging apparatus comprising, in combination, a plurality of radiation detecting elements, means to move said elements through a well in vertical relationship spaced from one another so that adjacent elements are equally spaced from one another, a photographic film, a plurality of radiation emitters positioned adjacent said film so that adjacent emitters are equally spaced from one another longitudinally of said film, means to energize said emitters in response to the output signals from respective ones of said detecting elements, and means to move said film relative to and longitudinally of said emitters at a speed proportional to the speed of movement of said detecting elements through the well so that radiation emitted from a given level in the well is recorded at a common portion on said film by each of said detecting elements and its associated radiation emitter.

References Cited in the file of this patent

UNITED STATES PATENTS

| | | |
|---|---|---|
| 2,037,924 | Rentschler | Apr. 21, 1936 |
| 2,257,774 | Von Ardenne | Oct. 7, 1941 |
| 2,390,433 | Fearon | Dec. 4, 1945 |
| 2,475,137 | Herzog | July 5, 1949 |
| 2,648,012 | Scherbatskoy | Aug. 4, 1953 |
| 2,727,154 | Goldsworthy | Dec. 13, 1955 |
| 2,755,390 | Teichmann | July 17, 1956 |